US010042615B2

(12) United States Patent
Fredrickson et al.

(10) Patent No.: US 10,042,615 B2
(45) Date of Patent: *Aug. 7, 2018

(54) PROCESS CONTRIBUTIONS IN A METHOD ARCHITECTURE

(75) Inventors: J. Todd Fredrickson, Rockledge, FL (US); Peter Haumer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2985 days.

This patent is subject to a terminal disclaimer.

(21) Appl. No.: 11/322,951

(22) Filed: Dec. 30, 2005

(65) Prior Publication Data
US 2007/0073741 A1   Mar. 29, 2007

Related U.S. Application Data

(63) Continuation-in-part of application No. 11/238,550, filed on Sep. 29, 2005, now Pat. No. 8,639,726.

(51) Int. Cl.
| | |
|---|---|
| *G06F 17/30* | (2006.01) |
| *G06F 8/20* | (2018.01) |
| *G06Q 10/10* | (2012.01) |
| *G06F 8/30* | (2018.01) |

(52) U.S. Cl.
CPC .......... *G06F 8/22* (2013.01); *G06F 8/30* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 6,023,702 A * | 2/2000 | Leisten et al. | ................ | 707/100 |
| 6,278,977 B1 * | 8/2001 | Agrawal et al. | .................. | 705/7 |
| 6,615,199 B1 * | 9/2003 | Bowman-Amuah | ........... | 706/50 |
| 6,766,326 B1 * | 7/2004 | Cena | ............................ | 707/101 |
| 6,912,719 B2 * | 6/2005 | Elderon et al. | ............... | 719/319 |
| 6,976,257 B2 * | 12/2005 | Leymann et al. | ............ | 718/103 |
| 7,200,597 B1 * | 4/2007 | Grizzard | ......................... | 707/10 |
| 7,251,693 B2 * | 7/2007 | Stull et al. | .................... | 709/225 |

(Continued)

OTHER PUBLICATIONS

Haumer, Peter; IBM Rational Method Composer: Part 1: Kay; http://www-128.ibm.com/developerworks/rational/library; Dec. 26, 2005.

(Continued)

*Primary Examiner* — Amresh Singh
(74) *Attorney, Agent, or Firm* — Steven M. Greenberg, Esq.; CRGO Law

(57) ABSTRACT

Embodiments of the present invention address deficiencies of the art in respect to method and process management, and provide a data processing system, method, and computer program product for process contributions in a method architecture. In accordance with an embodiment of the present invention, a data processing system configured for process contributions can include a method management tool configured for composing a process utilizing the method architecture. The system further can include one or more source method elements combinable to define an activity for the process. Finally, the system can include one or more process contributions defining variations in the activities of the process.

7 Claims, 3 Drawing Sheets

(56) References Cited

U.S. PATENT DOCUMENTS

| | | | | |
|---|---|---|---|---|
| 2001/0039594 | A1* | 11/2001 | Park | G06F 8/20 |
| | | | | 719/311 |
| 2003/0188290 | A1* | 10/2003 | Corral | 717/101 |
| 2003/0217117 | A1* | 11/2003 | Dan et al. | 709/218 |
| 2005/0102276 | A1* | 5/2005 | Dinh et al. | 707/3 |
| 2005/0203967 | A1* | 9/2005 | Matsui | 707/202 |
| 2006/0004749 | A1* | 1/2006 | Dettinger | G06Q 10/06 |
| 2006/0074726 | A1* | 4/2006 | Forbes et al. | 705/7 |
| 2006/0074735 | A1* | 4/2006 | Shukla et al. | 705/8 |
| 2006/0293880 | A1* | 12/2006 | Elshishiny et al. | 704/10 |
| 2007/0180424 | A1* | 8/2007 | Kazakov et al. | 717/104 |
| 2007/0240046 | A1* | 10/2007 | Yan | G06Q 10/06 |
| | | | | 715/700 |

OTHER PUBLICATIONS

Balduino; Ricardo; Basic Unified Process: A Process for Small and Agile Projects; www.eclipse.org/proposals/beacon/Basic%20Unified%20Process.pdf.

* cited by examiner

PROCESS CONTRIBUTIONS IN A METHOD ARCHITECTURE

CROSS-REFERENCE TO RELATED APPLICATIONS

This patent application claims the benefit under 35 U.S.C. § 120 as a continuation-in-part of U.S. patent application Ser. No. 11/238,550, entitled UNIFIED METHOD ARCHITECTURE, filed on Sep. 29, 2005, now U.S. Pat. No. 8,639,726, the entire teachings of which are incorporated herein by reference.

BACKGROUND OF THE INVENTION

Field of the Invention

The present invention relates to the field of conceptual frameworks and tool support for the management of methods and processes, and more particularly to the systematic management of libraries of related method content and processes.

Description of the Related Art

A method architecture describes a schema for organizing large amounts of descriptions for development methods and processes, such as software engineering, mechanical engineering, business transformation, sales cycles and the like. A development method provides step-by-step explanations for a particular way of achieving a specific development goal under general circumstances such as transforming a requirements document into an analysis model, defining an architectural mechanism based on functional and non-functional requirements, creating a project plan for a development iteration, defining a quality assurance plan for functional requirements, or redesigning a business organization based on a new strategic direction.

A development process takes several of these methods and combines method steps into semi-ordered sequences creating a structure that is specific to temporal development circumstances such as how work is to be organized over time. The structure also can be specific to one type of development project, for instance the characteristics of the development project including development software for an online system versus software and hardware for an embedded system. A process is defined based on a lifecycle, which specifies how method elements such as tasks are being applied and work products are being produced over time by particular roles within the process.

Presently, there are several frameworks available in industry for the documentation of methods and the specification of processes. Commercial method and process management products include the Rational Unified Process Workbench manufactured by IBM Corporation of Armonk, N.Y., United States. International standards for schemas for method and process management systems also exist. The most widely know standard of this field is the Software Process Engineering Meta-Model (SPEM) version 1.1 released by the Object Management Group (OMG).

Commercial method and process management products have been widely deployed for use in the enterprise. While, each has a different architecture and usage, and further, while none are compatible with one another, all permit the specification of a process having different process patterns each including different activities defined by tasks for the activity. Changing a process pattern in a process to produce a variant of the process pattern often means manually constructing the variant with differences in activities and tasks to incorporate the underlying features of the base process. To do so, however, can provide for a redundancy in specifying variants of a process. Moreover, changes in the underlying base process must be manually carried over in the variant to maintain the integrity of the variant.

BRIEF SUMMARY OF THE INVENTION

Embodiments of the present invention address deficiencies of the art in respect to method and process management, and provide a novel and non-obvious data processing system, method, and computer program product for process contributions. In accordance with an embodiment of the present invention, a data processing system configured for process contributions can include a method management tool configured for composing a process utilizing the method architecture. The system further can include one or more source method elements combinable to define activities for processes. Finally, the system can include one or more process contributions defining variations in the activities.

The process can include an arrangement of descriptors mirroring default structural relationships of the source method elements. Each of the descriptors can be configured to permit changes to the arrangement between the descriptors without changing the default structured relationships of the source method elements. Also, each of the source method elements can include either a task, a role or a work product. Finally, each of the descriptors in the arrangement can inherit from a breakdown element, such that the activity can include an aggregation of breakdown elements in a work breakdown structure.

In an aspect of the embodiment, a process contribution can include one or more activities that specialize a base instance of a process specializing each activity. The activities participating in the specialization are generalized by a variability element class. The variability element class in turn includes a variability type. Specifically, the variability type can include one of a contributes relationship, or a replaces relationship that indicates the type of the process contribution.

In another embodiment of the invention, a method for composing a variant process for a base process can include defining a process contribution for a base process, combining the process contribution with the base process to produce the variant process by interpreting the rules defined for "contributes" and "replaces" variability and by rendering the variant process in a process view for a methods management tool. Defining a process contribution for a base process can include specifying only variant sub-activities, variant descriptors, or variant associations for the base process. Moreover, defining a process contribution for a base process activity must include setting a variability type for the process contribution.

Whenever a "contributes" variability type is chosen, all sub-activities, descriptors, and relationships of the specializing activity are added to the interpretation of the base process activity. Likewise, whenever a "replaces" variability type is chosen, all sub-activities, descriptors, and relationships of the specializing activity replace all sub-activities, descriptors, and relationships of the base process activity.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, data processing system and computer program product for process contributions in a method architecture. In accordance with an embodiment of the present invention, a process contribution acting as a plug-in can be provided for a process in a process model in order to update the process a posteriori with new or changed capabilities. Through the plug-in, alternative variants of the process can be provided by specifying only the differences of each variant. Yet, a plug-in enabled variant of a process can be utilized as a process in the unified methods architecture as if the plug-in enabled variant includes the entirety of method content of the underlying process. In consequence, redundancy in specifying variants of a process can be minimized to only the differences among the variants in respect to the process.

Figure 1:
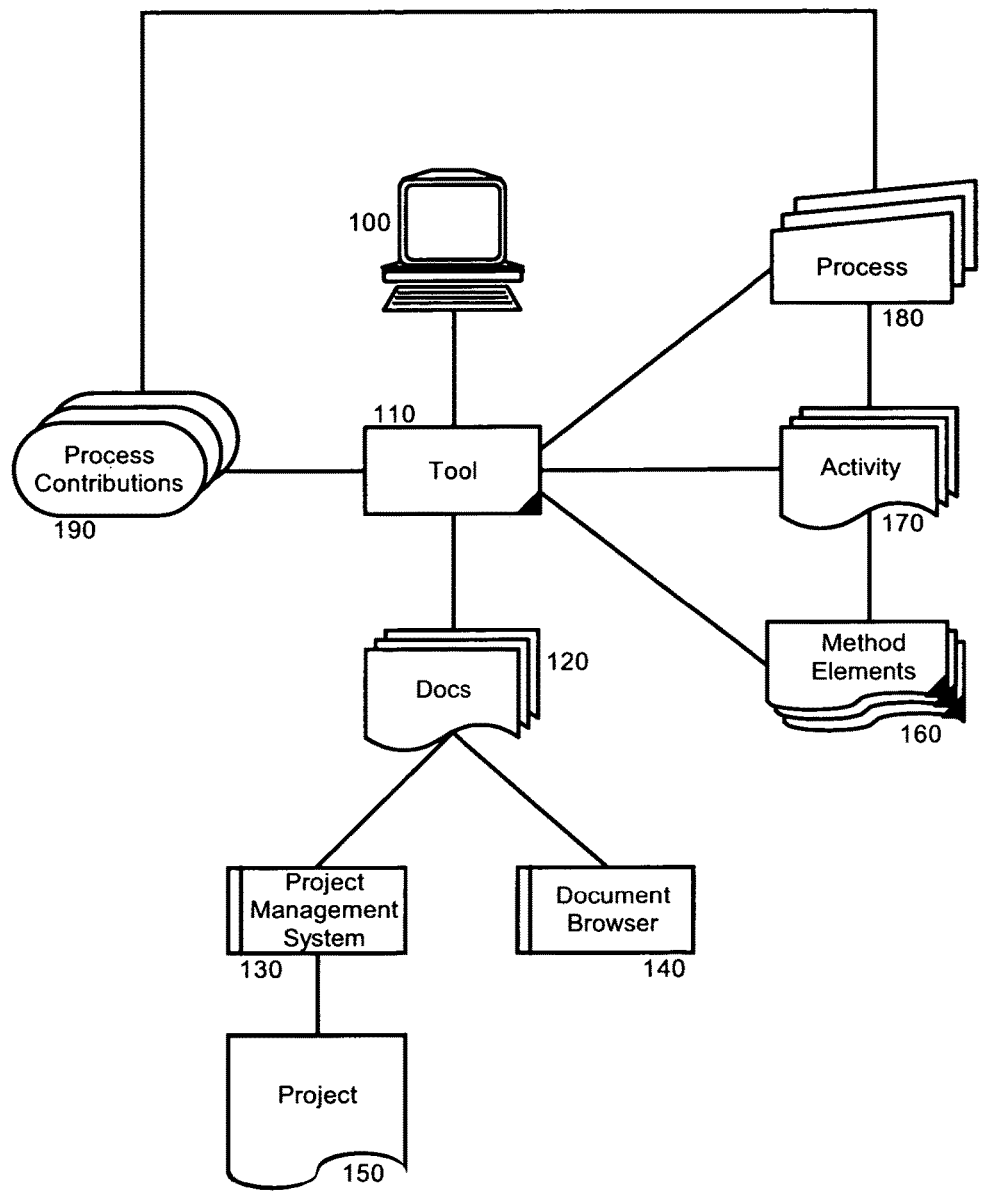
FIG. 1 is a schematic illustration of a methods management system configured for process contributions for a method architecture.

In more particular illustration, FIG. 1 is a schematic illustration of a methods management system configured for process contributions for a method architecture. Referring to FIG. 1, a computing platform 100 can host a methods management tool 110 configured to arrange method elements 160 into activities 170 using descriptors for one or more processes 180 in a model. The method elements 160 can define project methods and describe core element of methods in terms of roles, tasks, work products and guidance.

Generally, the reusable method elements 160 can provide step-by-step explanations of a project goal, describing how specific project goals can be achieved independently of the placement of the steps within a project lifecycle. As such, the methods management tool 110 can be configured to arrange the reusable method elements 160 to produce one or more process documents 120. The documents 120 can provide a description of a process and can be viewed within a document browser 140. Alternatively, the documents 120 can be provided as input to a project management system 130 to produce a project plan 150.

A process 180 can combine method elements 160 into semi-ordered sequences creating a structure that is specific to temporal project circumstances such as how work is to be organized over time. Importantly, the methods management tool 110 can further be configured to extend a process 180 with process contributions 190. Each of the process contributions 190 can act as a plug-in to an activity 170 of a process 180 defined by a structured collection of method elements 160. In this regard, each of the process contributions 190 can specify only those differences in the processes 180 for an activity 170 between an activity 170 for the process 180 and a variant of this activity 170.

Figure 2:
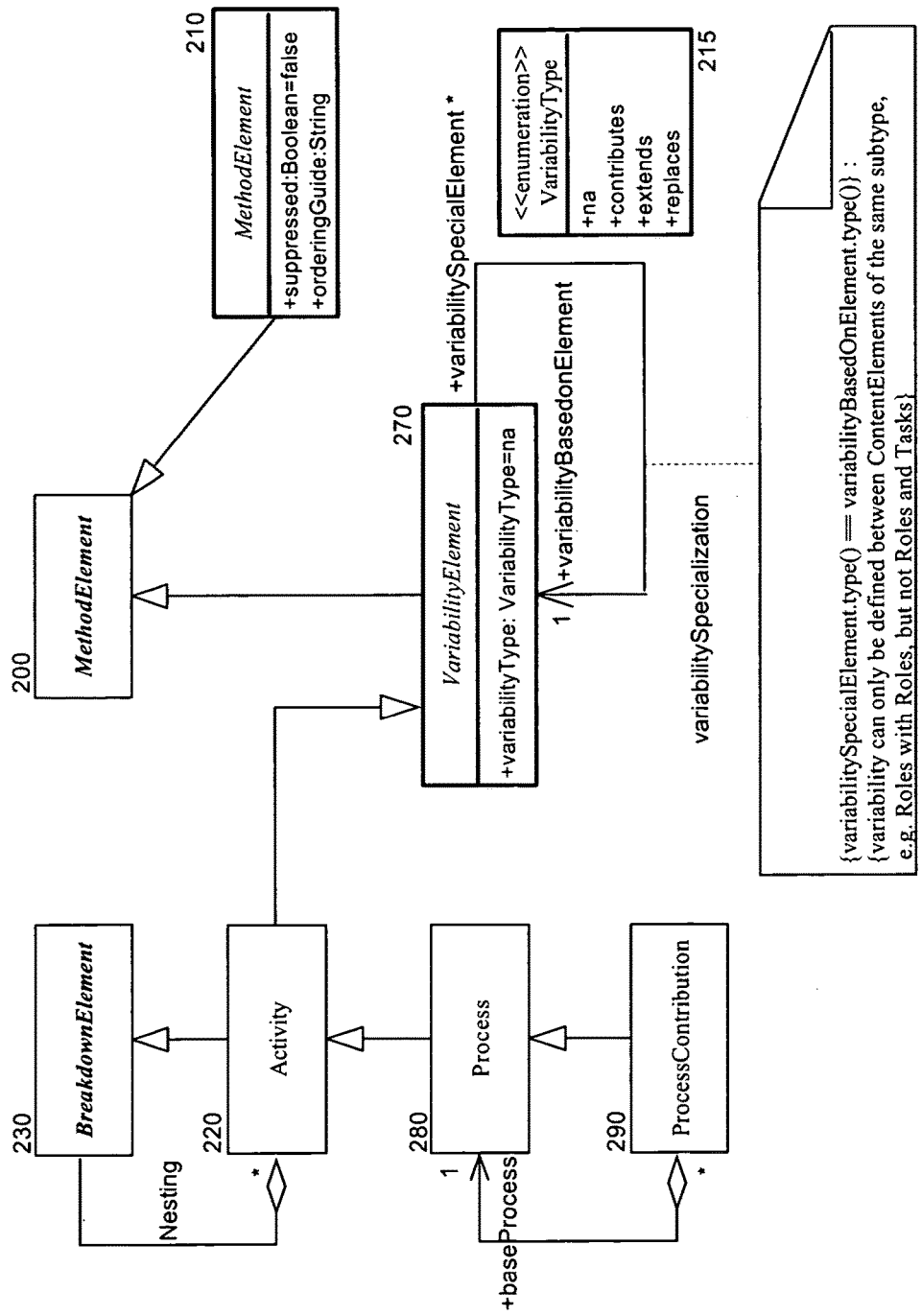
FIG. 2 is a class diagram of the method architecture incorporating process contributions; and, FIG. 3 is a pictorial illustration sequence of a methods management system user interface depicting a process contribution to an activity.

In further illustration, FIG. 2 is a class diagram of the method architecture defining the structures utilized for process contributions 190. As shown in FIG. 2, a variability element 270 can be an abstract class derived from a method element 200. The variability element 270 is a meta-model specialization of method element 200 and a meta-model generalization for activity 220 in a taxonomy of classes for the method architecture. Operationally, the variability element 270 can provide new capabilities for content variation and extension to content elements or any other method element 200 that derives from the variability element 270. Process contribution makes use of this capability for defining variants on processes, because processes are primarily constructed using activities 220.

Notably, the variability element 270 can include a relationship of variability specialization which can be instantiated between two subclasses of the variability element 270 of the same concrete type. As shown in FIG. 2, a variability element subclass on the variability special element side of the relationship between variability element subclasses can define a value for the attribute variability type. The attribute can define the nature of the relationship using a literal from the enumeration variability type 215. In this regard, the nature of the relationship can be a "contributes" relationship or a "replaces" relationship.

In accordance with the present invention, a process contribution 290 can generalize a base instance of a process 280. The base instance of the process 280, in turn, can generalize the activity 220 generalized from a nested arrangement of one or more instances of a breakdown element 230 in a methods architecture. The activity 220 can be specialized for the process contribution 290 by deriving from the variability element 270 as a variability specialization.

In operation, the process contribution 290 can provide a mechanism for activities that are instances of the variability element 270 to contribute or replace respective properties into a base instance of the variability element 270 without directly altering any existing property of the base instance of the variability element 270. Properties contributed or replaced can include attribute values and association instances. The effect after interpretation of the process contribution 290 is that the base instance of the variability element 270 is logically replaced with an augmented variant instance of the variability element 270 that combines or replaces attribute values and association instances.

The combination or replacement of attribute values and association instance can be achieved variably depending upon the type of the attribute or association. For example, for contributes variability string attributes can be concatenated resolving embedded commands for dependent text or merging text fragments such as descriptions for content elements. Additional elements in "to-many" associations are added such as the addition of additional methods guidance elements or task descriptors of an activity. Different elements in "to-one" associations must be ignored whereas multiple instances of variability elements 270 can contribute to the same base instance of a variability element 270. In the latter circumstance, the process contribution 290 properties can added to the base instance of the variability element 270 in the same fashion.

The combination of attribute values and association instance can adhere to several rules. First, attributes can be appended except for identifying and naming attributes and non-string attributes such as boolean and date. Second, outgoing "to-one" associations of an instance of the process contribution 290 can be ignored if the base instance of the variability element 270 already has such an association, or if the base variability element 270 has more than one contributing element such that it cannot be decided which instance of process contribution 290 is to be chosen. Third, outgoing "to-many" associations are added to the base instance of the variability elements 270.

Fourth, incoming associations to the instance of the process contribution 290 with a "to-one" constraint on the other association end can be ignored if the base instance of the variability element 270 already has such an incoming association, or if there is more than one contribution to consider for the base instance of the variability element 270. Other incoming associations to the instance of the process contribution 290 can be added to the base instance of the variability element 270. Finally, contribution of attributes and associations is transitive in that a contributing instance of a process contribution 290 contributes its own instances of the process contribution 290.

Figure 3:
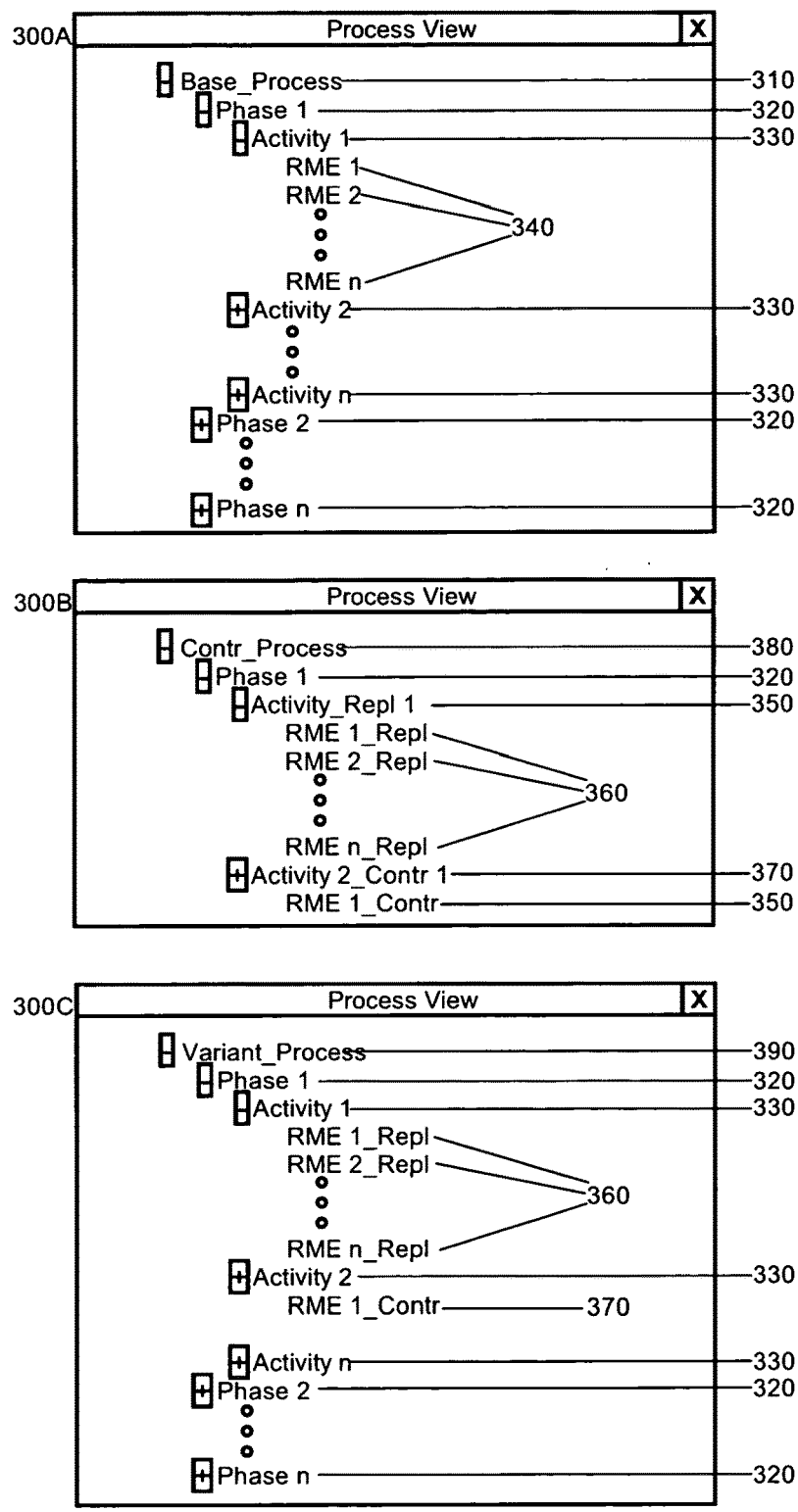

In yet further illustration, FIG. 3 is a pictorial illustration sequence of a methods management system user interface depicting a process contribution to an activity. As shown in FIG. 3, a process view 300A can include a hierarchical rendering of a base process 310. The base process 310 can include one or more process phases 320, each phase 320 including one or more activities 330. Each activity 330, in turn, can include references to one or more method elements 340 represented as descriptors. A different process view 300B can include a hierarchical rendering of a process contribution 310. Unlike the base process 310, however, the process contribution 380 can include a rendering only of those variant activities 350, 370 having different or additional method elements 360.

A yet different process view 300C can include a hierarchical rendering of a variant process 390 combining the variations of the process contribution 380 with the base process 310. As shown in FIG. 3, the variant activities 350, 370 having different or additional method elements 360 can be incorporated into the process phases 320 of the base process 310. For variant activities 350 which replace the activities 330 of the base process 310, the activities 330 of the base process 310 can be replaced with the variant activities 370. Similarly, for variant activities 370 which contribute to the activities 330 of the base process 310, the variant activities 370 can be added to the existing activities 330 of the base process 310. Consequently, specifying a variant process 390 can be minimized to only the differences between the variant process 390 and the base process 310 in the method architecture.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for composing a variant activity for a base process activity, the method comprising:

defining a process contribution as a plug-in for a base process activity of a process in a process model, the process contribution defining a variation in the base process activity formed from a combination of reusable source method elements each comprising textual step-by-step explanations of a project goal, describing how specific program goals are achieved independently of a placement of each step within a project lifecycle;

combining through the plug-in the process contribution with the base process activity to produce a plug-in enabled alternative variant of the process by specifying only the differences of the alternative variant with respect to the base process activity; and, rendering in a display of a computing platform the produced alternative variant process in a process view for a methods management tool for use as a process in a unified methods architecture as if the plug-in enabled variant included an entirety of method content of the base process activity, the methods management tool being configured for composing a process utilizing a method architecture by arranging re-usable source method elements into activities using descriptors for one or more processes in a model by displaying in the display a process view including a hierarchical rendering of the base process activity, additionally displaying in the computer platform a different process view including a hierarchical rendering of the process contribution for only variant activities from the base process activity having different or additional method elements, and yet further displaying in the computer platform a yet different process view including a hierarchical rendering of a variant process combining the variant activities of the process contribution with the base process activity, the method management tool producing one or more process documents including the base process activity with the variation defined by the process contribution for viewing in a document browser and provided as input to a project management system to produce a project plan.

2. The method of claim 1, wherein defining a process contribution for a base process activity comprises specifying only variant sub-activities and descriptors for the base process activity.

3. The method of claim 1, wherein defining a process contribution for a base process activity comprises specifying only variant associations for the base process activity.

4. The method of claim 1, wherein defining a process contribution for a base process activity comprises setting a variability type for the process contribution.

5. The method of claim 4, wherein setting a variability type for the process contribution comprises setting one of a contributes relationship and a replaces relationship for the process contribution.

6. The method of claim 5, wherein setting one of a contributes relationship and a replaces relationship for the process contribution, further comprises for a contributes relationship adding new elements to an interpretation of the base process activity to include all sub-elements of the process contribution.

7. The method of claim 5, wherein setting one of a contributes relationship and a replaces relationship for the process contribution, further comprises for a replaces relationship replacing all elements of an interpretation of the base process activity with all sub-elements of the process contribution.

* * * * *